May 10, 1927.

J. DE HAES 1,628,580

FILM SHIFTING MECHANISM

Filed Feb. 13, 1925

2 Sheets-Sheet 1

J. De Haes INVENTOR

BY Victor J. Evans ATTORNEY

May 10, 1927.

J. DE HAES 1,628,580

FILM SHIFTING MECHANISM

Filed Feb. 13, 1925     2 Sheets-Sheet 2

J. De Haes
INVENTOR

BY Victor J. Evans
ATTORNEY

Patented May 10, 1927.

1,628,580

UNITED STATES PATENT OFFICE.

JEROME DE HAES, OF CHICAGO, ILLINOIS.

FILM-SHIFTING MECHANISM.

Application filed February 13, 1925. Serial No. 9,040.

This invention relates to new and useful improvements in film shifting mechanism and more particularly to a device adapted to be applied to various types of cameras for automatically shifting the film after an exposure has been made. The main object of my invention is the provision of a film shifting mechanism wherein the film is automatically shifted to position upon the exposure of the same whereby the unexposed portions of the film will be automatically moved to position ready for exposure.

Another object of my invention is the provision of a device of the above character which is operated simultaneously immediately following the exposure of a film whereby the next unexposed portion of the film will be brought into alignment with the exposure openings to be exposed by the shifting of the shutter plate.

A further object of my invention is the provision of a film shifting mechanism whereby after a film has been positioned in the camera the first exposure on the film may be readily moved into position before the exposure opening and the remaining exposure portions of the film are intermittently moved into exposing position through the operation of the shutter plate whereby each portion of the film to be exposed will be brought into alignment directly after the exposure of the preceding portion of the film.

Figure 1:
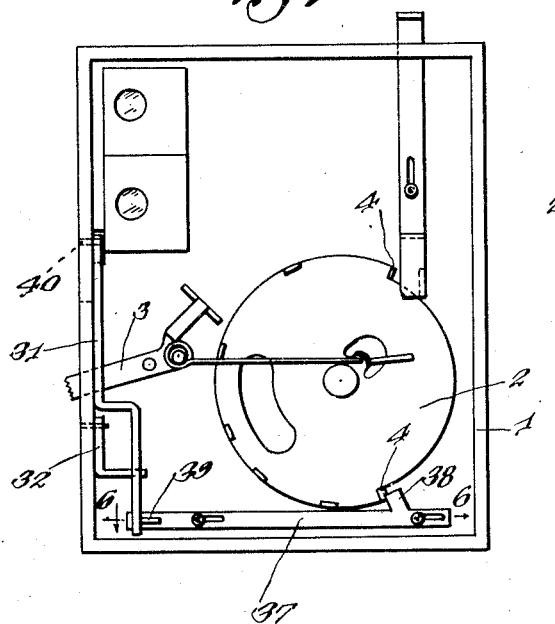
Figure 7:
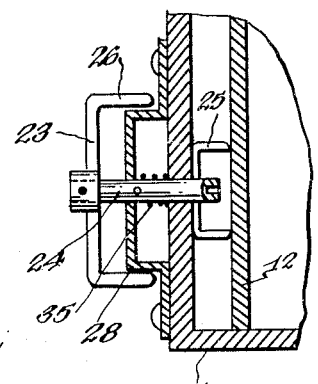
Figure 9:
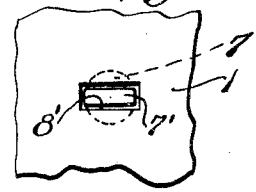
Figure 6:
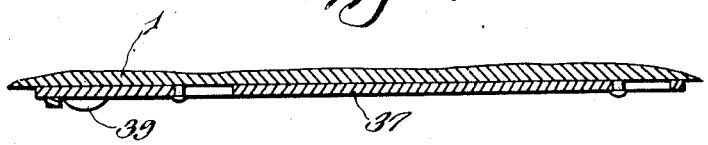
Figure 5:
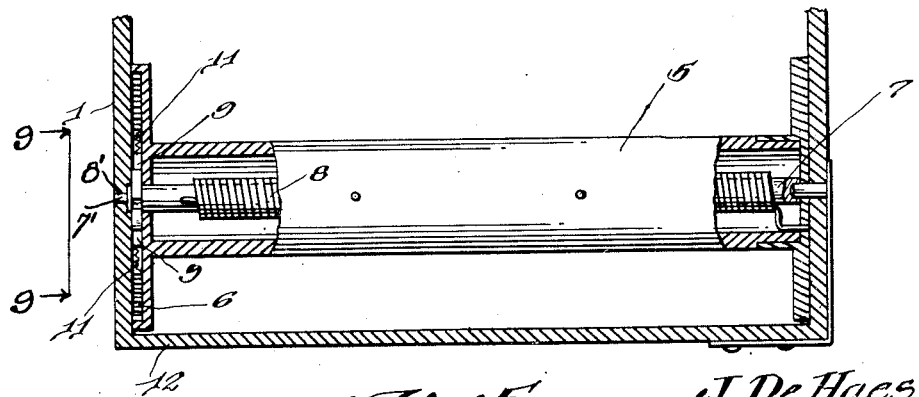
Figure 2:
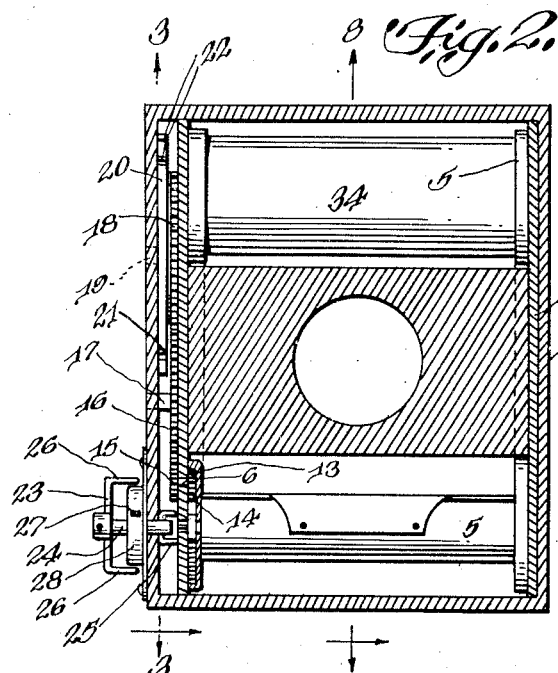
Figure 8:
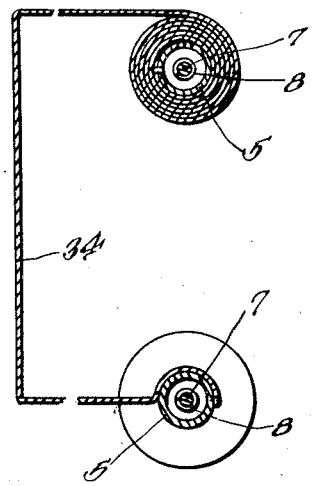
Figure 3:
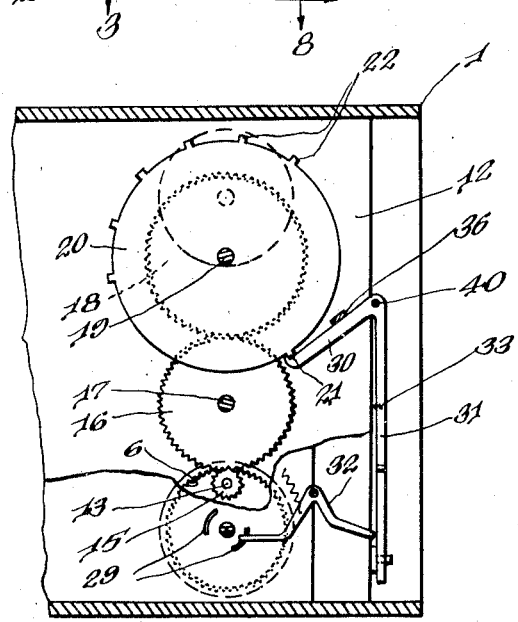
Figure 4:
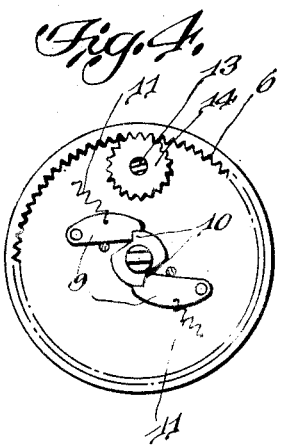

With the above and other objects in view, the invention consists in the novel features of construction, the combination and arrangement of parts hereinafter more fully set forth, pointed out in the claims and shown in the accompanying drawings, in which:

Fig. 1 is a front elevation of a camera, the front part of the casing being removed, Fig. 2 is a rear elevation with the mask plate removed, Fig. 3 is a vertical section on the line 3—3 of Fig. 2, Fig. 4 is an end elevation of one of the film-supporting rolls, Fig. 5 is a side elevation of one of the rolls in position, parts of the same being broken away and illustrated in cross-section, Fig. 6 is a detail sectional view on the line 6—6 of Fig. 1, Fig. 7 is a detail enlarged section through a portion of the device, Fig. 8 is a section of the film-supporting rolls, illustrating the film in operative position and connected to both of the rolls, Fig. 9 is a fragmentary elevational view taken substantially on line 9—9 of Fig. 5.

In carrying out my invention, I prefer to apply the device to what is known as a box type camera, although it will be readily appreciated that the device may be used equally as well on other types of cameras. In the drawings, the numeral 1 indicates the body of the camera which carries the usual spring actuated shutter plate 2 operated by the oscillating lever 3 which is adapted to impart a rotary movement to the shutter 2 to bring the stop shoulders 4 thereon into contact with a suitable form of stop.

The type of roll used in my improved shifting mechanism is illustrated in Figure 5, the body of the roll 5 having at one end thereof an internal gear 6 and provided with a central shaft 7 upon which is mounted a tension spring 8, the spring being retained under tension by means of the pawls 9 carried by the internal gear member 6 and adapted to engage opposed shoulder members 10 carried by one end of the shaft 7. The pawls 9 are retained in engagement with the shoulders 10 through the tension of the spring 8 and when they are removed from the shoulders 10 the springs 11 will retain them out of engagement with the shoulders to permit rotation of the roll 5 through the tension of the spring 8.

In the present instance, the roll-carrying case 12 upon the interior of the camera body 1 has one wall thereof spaced from one wall of the body as shown in Figure 2, the wall of the roll-carrying case having a transverse shaft 13 with pinions 14 and 15 mounted upon each end thereof, the pinion 14 cooperating with the internal gear 6 on the rolls used for carrying the film. The pinion 15 engages an intermediate gear 16 mounted upon a stub shaft 17 which is carried by the outer wall of the body 1. This gear 16 meshes with an upper gear 18 carried by the inner end of the stub shaft 19 which in turn is supported by the outer wall of the body 1 whereby upon movement of the lower roll member 5 upon which the film is to be wound, movement will be imparted to the gear 18 simultaneously with the movement of the roll.

The shaft 19 carries a disc 20 which has a stop lug 21 arranged at a predetermined point upon the periphery of the disc and a plurality of stop lugs 22 are arranged in equal spaced relation at a predetermined position with respect to the lug 21, the purpose of which will be hereinafter more fully set forth.

As noted in Figure 2, a loaded film has been positioned within the film-carrying case 12 in the cavity provided therefor, said roll being adapted to rotate free upon its trunnions and the ends thereof frictionally engage the side wall of the film-carrying case in order to prevent the roll from rotating at the improper time. The film-carrying strip, as illustrated in Figure 8, has been moved to proper position so that the outer end thereof is engaged with the lowermost unloaded roll. At this point I wish it to be understood that the springs 8 are placed under tension either prior to loading the roll or prior to distribution so that the lowermost roll upon which the film is to be wound will be in position for rotative movement upon release of the pawls 9 from the shoulders 10. The shoulders 10 cooperate with the spring pressed pawls 9 in such a manner as to cause the tension of the spring 8 to retain the shoulders in contact with the pawls until the pawls are released. In placing the unloaded roll in position, as shown in Figure 2, the in-carrying internal gear 6 is arranged for engagement with the pinion 14. It will be noted that the end of the shaft 7 which carries the internal gear 6 is provided with a flattened end 7' which fits within an opening 8' in the wall of the carrying case in order to prevent the shaft 7 from turning when the unloaded roll is placed in position as shown in Figures 5 to 8, thus when the pawls 9 are released, the tension of the spring 8 will cause rotative movement of the unloaded roll relative to the shaft 7.

An operating key 23 is carried by the outer wall of the body 1 and includes a circular shaft 24 which is mounted in the wall of the body and carries a fork 25 at its inner end. The outer end of the shaft 24 carries the key 23 which in turn is provided with downturned ends as shown at 26 for engagement with the stop 27 on a cap member 28 attached to the body of the camera.

The wall of the case 12 has formed therein arcuate slots 29 arranged upon opposite sides of the center shaft 7 as shown in Figure 3 for receiving the ends of the fork member 25. The disc 20 is normally retained in an inactive position by means of a pivoted catch 30 attached to a movable arm 31. As illustrated in Figure 3 the catch 30 is in engagement with the lug 21 and mounted within the body and positioned adjacent the gear end of the roll receiving the film is a rocker arm 32, one end of which is positioned adjacent one of the slots 29 while the other end thereof is normally in contact with the arm 31. Thus after the loaded and unloaded rolls have been placed in position as shown in Figure 2, in order to move the first section of the unexposed film into position, the shaft 24 is positioned inwardly, the forks 25 engaging the opposed ends of the slots 29 whereby one of the fork members will contact with one end of the rocker arm 32 and by turning the key 23 until one of the inturned ends 26 engage the stop 27, the rocker arm 32 will be actuated to release the arm 31 so that the tension of the spring 8 will disengage the catch 30 from the lug 21 which operation will also disengage the pawls 9 from the shoulders 10 due to the fact that the prongs 25 when positioned in opposite ends of the slots 29 will engage these pawls so as to disengage them from the shoulders 10 upon turning movement of the key 23, this operation releases the spring 8 carried by the unloaded roll, the tension of which will impart a rotative movement to the roll and move the film-carrying sheet 34 so as to wind the same upon the unloaded roll and bring the first section of the unexposed film into position for exposure.

The particular purpose of the stop 27 is that when grasping the key 23, the same may be rotated in either direction until the ends 26 thereon engage with the stop 27 and when in this position the prongs 25 are so arranged that they will engage in the proper ends of the slots 29 to permit the above operation.

In the above operation, it will be apparent that as soon as the key 23 has been turned so that the ends 26 thereof engage the stop 27, the key is quickly released from the fingers of the operator so that the tension of the spring 35 will disengage the fork 25 from the slots 29 and permit the arm 31 to return to its normal position so that the catch 30 will be in position to engage the first in order of the lugs 22, thus stopping the movement of the film in proper position so that the first unexposed section thereof will be in line for exposure. In order to limit the upward movement of the catch 30, a stop 36 is arranged in proper position whereby to prevent the end of the catch 30 from riding on the periphery of the disc 20.

In the above operation, the first unexposed section of the film has been moved into exposing position and in order to bring the other sections of the unexposed sections of the film into exposing position, a sliding bar 37 is mounted for movement beneath the shutter plate 2 and has a stop arm 38 thereon projecting upwardly in the path of the stop shoulders 4 on the plate 2 so that as soon as the first section of the film has been exposed the shoulder 4, in accordance with the direction in which the shutter plate 2 is operated will engage the arm 38 and reciprocate the bar 37 in either direction. This movement of the bar will move the cam 39, carried by the bar, into contact with the lower end of the arm 31 and rock this arm upon its pivot 40 whereby to disengage the catch 30 from the first one of the series of lugs 22, it being understood that the catch 30 is moved out of position only during the time the cam 39 passes the arm 31. This movement is quickly accomplished due to the momentum of the shutter plate 2 so that the catch 30 is quickly moved out of engagement with the first series of lugs 22 and quickly returned into engaging position by the spring 33 so that the second one of the series of lugs 22 will be engaged by the catch and so retain the second section of the unexposed film in position for exposure. The above operation is repeated until all of the sections on the unexposed film have passed the exposure position after which the space between the last one of the series of the lugs 22 and the lug 21 will permit the end of the film-carrying strip 34 to be wound upon the lowermost roll, leaving the roll in position to be removed from the camera.

In the present construction, I have illustrated the disc 20 provided with a sufficient number of lugs 22 to accommodate a film roll having six exposures thereon and at this time I desire to call attention to the fact that the ratio of the gears and pinions connecting the internal gear 6 with the disc 20 is such as to rotate the disc 20 slowly so that after the arm 31 has been actuated to release the catch 30 from one of the lugs, it will have sufficient time to move back into the path of the next lug and after all of the exposures have passed their exposing position the catch 30 will be disengaged from the lattermost of the lugs 22 and proper space is provided for between the lattermost lug 22 and the lug 21 to permit the disc 20 to rotate sufficiently to unwind the inner end of the film-carrying strip 34 from the loaded roll and wind the same upon the roll being loaded. It will be readily understood that the disc 20 may be so arranged as to accommodate any number of lugs 22 so that a film with 12 exposures may be used if found desirable.

It will be apparent from the foregoing that I have provided an effective device adapted to be applied to various makes of cameras whereby the film is automatically shifted through the operation of the shutter plate to move the various sections of the unexposed film into position for exposure at the proper time, thus eliminating the accidental double exposure which results in the necessity of operating the film shifting mechanism by hand. The spring 35 which detaches the fork 25 from the arcuate slots 29 is positioned between the outer wall of the cap 28 and the body of the camera, as clearly illustrated in Figure 7, so that when the shaft 24 is moved inwardly the spring is placed under tension whereby upon releasing the key 23, the spring will quickly disengage the fork 25 from the slots 29.

While I have shown and described the preferred embodiment of my invention, it will be understood that various changes and alterations may be made without departing from the spirit of the invention or the scope of the appended claims.

Having thus described my invention, what I claim is:

1. A camera of the class described, the combination with a non-rotatable shaft defining at one end portion opposite shoulders, a film roller associated with the shaft for relative movement, a spring member operatively connecting the roller to the shaft, a shutter, and a pair of cooperating pawls pivotally carried by the roller and adapted for engagement with the shoulders for retaining said roller against relative movement with respect to the shaft by action of the spring member, of means for permitting intermittent movement of the roller relative to the shaft by action of said spring member, said means including a disc having a plurality of lugs formed thereon, a movable arm having an end portion defining a catch adapted for engagement successively with the lugs, means operably connecting the disc to the roller, a rocker arm having an end portion adapted for engagement with the opposite end portion of the movable arm, an operating member carried by the body of the camera and defining portions movable into engagement with the pawls for disengaging the pawls from the shoulders and movable into engagement with the rocker arm for urging the rocker arm to operate upon said opposite end portion of the movable member to move said catch from engagement with one of the lugs disposed adjacent the catch member, means for operating said operating member, and means operable by the shutter for operating upon said movable member to permit intermittent movement of said disc independently of the operating member.

2. A camera of the class described, the combination with a non-rotatable shaft defining at one end portion opposite shoulders, a film roller associated with the shaft for relative movement, a spring member operatively connecting the roller to the shaft, a shutter, and a pair of cooperating pawls pivotally carried by the roller and adapted for engagement with the shoulders for retaining said roller against relative movement with respect to the shaft by action of the spring member, of means for permitting intermittent movement of the roller relative to the shaft by action of said spring member, said means including a disc having a plurality of lugs formed thereon, a movable arm having an end portion defining a catch adapted for engagement successively with the lugs, means operably connecting the disc to the roller, a rocker arm having an end portion adapted for engagement with the opposite end portion of the movable arm, an operating member carried by the body of the camera and defining portions movable into engagement with the pawls for disengaging the pawls from the shoulders and movable into engagement with the rocker arm for urging the rocker arm to operate upon said opposite end portion of the movable member to move said catch from engagement with one of the lugs disposed adjacent the catch member, means for operating said operating member, and means operable by the shutter for operating upon said movable member to permit intermittent movement of said disc independently of the operating member, said means including a member operable by movement of the shutter and operable upon the movable member for disengaging the catch from engagement with one of the lugs adjacent the catch.

In testimony whereof I affix my signature.

JEROME DE HAES.